United States Patent
Roddy

(10) Patent No.: US 7,934,554 B2
(45) Date of Patent: May 3, 2011

(54) METHODS AND COMPOSITIONS COMPRISING A DUAL OIL/WATER-SWELLABLE PARTICLE

(75) Inventor: Craig W. Roddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 242 days.

(21) Appl. No.: 12/364,998

(22) Filed: Feb. 3, 2009

(65) Prior Publication Data

US 2010/0193191 A1    Aug. 5, 2010

(51) Int. Cl.
*E21B 33/138*    (2006.01)
*E21B 33/14*    (2006.01)
*E21B 43/04*    (2006.01)
*E21B 43/267*    (2006.01)
*C09K 8/467*    (2006.01)
*C09K 8/80*    (2006.01)

(52) U.S. Cl. ............... 166/278; 166/280.2; 166/293; 166/295; 166/305.1; 106/822; 106/823; 405/264; 507/117; 507/219; 524/2

(58) Field of Classification Search .............. None
See application file for complete search history.

(56) References Cited

U.S. PATENT DOCUMENTS

| | | | |
|---|---|---|---|
| 2,890,169 A * | 6/1959 | Prokop | 507/129 |
| 3,381,169 A | 4/1968 | Brock et al. | |
| 4,036,301 A | 7/1977 | Powers et al. | |
| 4,633,950 A | 1/1987 | Delhommer et al. | |
| 4,676,832 A | 6/1987 | Childs et al. | |
| 4,700,777 A | 10/1987 | Luers | |
| 5,252,128 A | 10/1993 | Gopalkrishnan | |
| 5,456,750 A | 10/1995 | Mackay et al. | |
| 5,456,751 A | 10/1995 | Zandi et al. | |
| 5,575,841 A | 11/1996 | Dry | |
| 5,660,624 A | 8/1997 | Dry | |
| 5,663,230 A | 9/1997 | Haman | |
| 5,688,844 A | 11/1997 | Chatterji et al. | |
| 5,779,787 A | 7/1998 | Brothers et al. | |
| 5,897,699 A | 4/1999 | Chatterji et al. | |
| 5,989,334 A | 11/1999 | Dry | |
| 6,261,360 B1 | 7/2001 | Dry | |
| 6,502,636 B2 | 1/2003 | Chatterji et al. | |
| 6,508,305 B1 | 1/2003 | Brannon et al. | |
| 6,527,849 B2 | 3/2003 | Dry | |
| 6,631,766 B2 | 10/2003 | Brothers et al. | |
| 6,645,288 B1 | 11/2003 | Dargaud et al. | |
| 6,767,398 B2 | 7/2004 | Trato | |
| 6,811,603 B2 | 11/2004 | Brothers et al. | |
| 6,832,651 B2 | 12/2004 | Ravi et al. | |
| 6,889,766 B2 | 5/2005 | Creel et al. | |
| 6,902,001 B2 | 6/2005 | Dargaud et al. | |
| 6,907,929 B2 | 6/2005 | Leroy-Delage et al. | |
| 6,926,081 B2 | 8/2005 | Sweatman et al. | |
| 6,962,201 B2 | 11/2005 | Brothers | |
| 7,007,755 B2 | 3/2006 | Reddy et al. | |
| 7,022,179 B1 | 4/2006 | Dry | |
| 7,026,272 B2 | 4/2006 | Reddy et al. | |
| 7,059,415 B2 | 6/2006 | Bosma et al. | |
| 7,077,203 B1 | 7/2006 | Roddy et al. | |
| 7,138,446 B2 | 11/2006 | Reddy et al. | |
| 7,143,828 B2 | 12/2006 | Reddy et al. | |
| 7,143,832 B2 | 12/2006 | Freyer | |
| 7,156,173 B2 | 1/2007 | Mueller | |
| 7,172,022 B2 | 2/2007 | Reddy et al. | |
| 7,199,086 B1 | 4/2007 | Roddy et al. | |
| 7,264,053 B2 | 9/2007 | Vargo, Jr. et al. | |
| 7,284,611 B2 | 10/2007 | Reddy et al. | |
| 7,294,194 B2 | 11/2007 | Reddy et al. | |
| 7,296,597 B1 | 11/2007 | Freyer et al. | |
| 7,303,014 B2 | 12/2007 | Reddy et al. | |
| 7,337,841 B2 | 3/2008 | Ravi | |
| 7,351,279 B2 | 4/2008 | Brothers | |
| 7,353,870 B2 | 4/2008 | Roddy et al. | |
| 7,395,860 B2 | 7/2008 | Roddy et al. | |
| 7,422,060 B2 | 9/2008 | Hammami | |
| 7,461,696 B2 | 12/2008 | Nguyen et al. | |
| 7,478,675 B2 | 1/2009 | Roddy et al. | |
| 7,482,309 B2 | 1/2009 | Ravi et al. | |
| 7,530,396 B1 | 5/2009 | Reddy et al. | |
| 7,607,484 B2 * | 10/2009 | Roddy et al. | 166/293 |
| 2004/0055748 A1 | 3/2004 | Reddy et al. | |

(Continued)

FOREIGN PATENT DOCUMENTS

EP    2025732 A1    2/2009

(Continued)

OTHER PUBLICATIONS

USPTO Office Action for U.S. Appl. No. 12/263,800 dated Jul. 28, 2009.

(Continued)

*Primary Examiner* — George Suchfield
(74) *Attorney, Agent, or Firm* — Tumey, LLP; Craig W. Roddy

(57) ABSTRACT

Methods and compositions are provided that relate to well bore treatments that comprise swellable particles. An embodiment includes a method that comprises introducing a fluid comprising a dual oil/water-swellable particle into a subterranean formation. Another embodiment includes a method of cementing that comprises: introducing a cement composition comprising cement, water, and a dual oil/water-swellable particle into a space between a pipe string and a subterranean formation; and allowing the cement composition to set in the space. Another embodiment includes a well treatment composition comprising a dual oil/water-swellable particle.

30 Claims, No Drawings

U.S. PATENT DOCUMENTS

| | | | |
|---|---|---|---|
| 2004/0144537 A1 | 7/2004 | Reddy et al. | |
| 2004/0168802 A1 | 9/2004 | Creel et al. | |
| 2004/0171499 A1 | 9/2004 | Ravi et al. | |
| 2004/0244978 A1* | 12/2004 | Shaarpour | 166/293 |
| 2004/0261990 A1 | 12/2004 | Bosma et al. | |
| 2005/0061206 A1 | 3/2005 | Reddy et al. | |
| 2005/0113260 A1 | 5/2005 | Wood | |
| 2005/0113262 A1 | 5/2005 | Ravi et al. | |
| 2005/0199401 A1 | 9/2005 | Patel et al. | |
| 2006/0086501 A1 | 4/2006 | Creel et al. | |
| 2006/0086503 A1 | 4/2006 | Reddy et al. | |
| 2006/0122071 A1 | 6/2006 | Reddy et al. | |
| 2006/0213662 A1 | 9/2006 | Creel et al. | |
| 2007/0012436 A1 | 1/2007 | Freyer | |
| 2007/0017676 A1 | 1/2007 | Reddy et al. | |
| 2007/0062691 A1 | 3/2007 | Reddy et al. | |
| 2007/0089643 A1 | 4/2007 | Roddy et al. | |
| 2007/0102157 A1 | 5/2007 | Roddy et al. | |
| 2007/0137528 A1 | 6/2007 | Le Roy-Delage et al. | |
| 2007/0142547 A1 | 6/2007 | Vaidya | |
| 2007/0151484 A1 | 7/2007 | Reddy et al. | |
| 2007/0151724 A1 | 7/2007 | Ohmer et al. | |
| 2007/0151730 A1 | 7/2007 | Reddy et al. | |
| 2007/0204765 A1 | 9/2007 | Le Roy-Delage et al. | |
| 2007/0227734 A1 | 10/2007 | Freyer | |
| 2007/0246225 A1 | 10/2007 | Hailey, Jr. et al. | |
| 2008/0017376 A1 | 1/2008 | Badalamenti et al. | |
| 2008/0099203 A1 | 5/2008 | Mueller et al. | |
| 2008/0108524 A1 | 5/2008 | Willberg et al. | |
| 2008/0135250 A1 | 6/2008 | Bosma et al. | |
| 2008/0261027 A1 | 10/2008 | Li et al. | |
| 2008/0261834 A1 | 10/2008 | Simon | |
| 2009/0071650 A1 | 3/2009 | Roddy et al. | |
| 2009/0088348 A1 | 4/2009 | Roddy et al. | |
| 2009/0124522 A1 | 5/2009 | Roddy | |
| 2010/0089581 A1* | 4/2010 | Nguyen et al. | 166/280.2 |

FOREIGN PATENT DOCUMENTS

| | | |
|---|---|---|
| GB | 2429725 | 3/2007 |
| GB | 2448099 A | 10/2008 |
| WO | WO 03008756 | 7/2001 |
| WO | WO 2004057715 | 7/2004 |
| WO | WO 2004101951 | 11/2004 |
| WO | WO 2004101952 | 11/2004 |
| WO | WO 2004109053 A2 | 12/2004 |
| WO | WO 2004109053 A3 | 12/2004 |
| WO | WO 2006053896 | 11/2005 |
| WO | WO 2009/015725 * | 2/2009 |
| WO | WO2009/138747 | 11/2009 |

OTHER PUBLICATIONS

PCT International Search Report and Written Opinion for International Application No. PCT/GB2010/000152 dated May 3, 2010.
USPTO Office Action for U.S. Appl. No. 12/152,327 dated Jul. 9, 2009.
USPTO Office Action for U.S. Appl. No. 12/283,398 dated Jul. 15, 2009.
Office Action from U.S. Appl. No. 12/263,800 dated May 1, 2009.
Office Action from U.S. Appl. No. 12/152,327 dated May 12, 2009.
Bosma, et al., "Design Approach to Sealant Selection for the Life of the Well," Society of Petroleum Engineers, SPE 56536, pp. 1-14, 1999.
Kleverlaan, et al., "Deployment of Swelling Elastomer Packers in Shell E&P," Society of Petroleum Engineers, SPE/IADC 92346, pp. 1-5, 2005.
Kennedy, et al., "The Use of Swell Packers as a Replacement and Alternative to Cementing," Society of Petroleum Engineers, SPE 95713, pp. 1-4, 2005.
Schlumberger brochure entitled "Futur Slurry Systems", 2007.
Cavanagh, et al., "Self-Healing Cement-Novel Technology To Achieve Leak-Free Wells," Society of Petroleum Engineers, SPE/IADC 105781, pp. 1-3, Feb. 2007.
Antonio, et al., "Swelling Packer Technology Eliminates Problems in Difficult Zonal Isolation in Tight-Gas Reservoir Completion," Society of Petroleum Engineers, SPE 107578.
Keshka, et al., "Practical Uses of Swellable Packer Technology to Reduce Water Cut: Case Studies From the Middle East and Other Areas," Society of Petroleum Engineers, SPE 108613, 2007.
Halliburton brochure entitled "Cement Assurance MC Tool", Oct. 2007.
Halliburton brochure entitled "Cement Assurance MA Tool", Oct. 2007.
Halliburton brochure entitled "Cement Assurance HE Tool", Oct. 2007.
Halliburton brochure entitled "Well Life III Cementing Service", Apr. 2008.
Ravi, et al., "Interventionless Zonal Isolation," E&P, pp. 93-94, May 2008.
"Water-Swellable Polymer Networks—From Hydrogels to Superabsorbers," available at http://www.sigmaaldrich.com/aldrich/technical%20ads/al_ms_ad46_water_polymers.pdf, printed from the Internet May 22, 2008.
"Volclay Waterstop-RX," CETCO, pp. 1-4, May 2002.
"Waterstop-RX Bentonite Waterstop," Master Guideline Specification for Cast-in-Place Cement, Section 032500, pp. 1-3, Jan. 2006.
Hunter, et al., "Life-of-well isolation takes intelligence," E&P, pp. 77-78, Sep. 2007.
Moroni, et al., "Zonal Isolation in Reservoir Containing CO2 and H2S," IADC/SPE 112703, pp. 1-9, Mar. 2008.
Ravi, et al., Maximizing Heavy-Oil Recovery by Containing Steam through Optimized Cementing, SPE/PS/CHOA 117516, pp. 1-7, Oct. 2008.
Halliburton brochure entitled "LifeCem Cements," available at http://www.halliburton.com, printed from the Internet Feb. 3, 2009.
Moroni et al., "Overcoming the Weak Link in Cemented Hydraulic Isolation," Society of Petroleum Engineers, SPE 110523, pp. 1-13, Nov. 2007.
Roth et al., "Innovative Hydraulic Isolation Material Preserves Well Integrity," Society of Petroleum Engineers, IADC/SPE 112715, pp. 1-14, Mar. 2008.
Bouras et al., "Responsive Cementing Material Prevents Annular Leaks in Gas Wells," Society of Petroleum Engineers, SPE 116757, pp. 1-10, Sep. 2008.
Chang et al., "Material properties of portland cement paste with nano-montmorillonite," J Mater Science, pp. 1-10, May 2007.
USPTO Office Action Summary dated Sep. 22, 2008 for U.S. Appl. No. 12/152,327, filed May 14, 2008, pp. 1-10.
USPTO Office Action Summary dated Jan. 22, 2009 for U.S. Appl. No. 12/152,327, filed May 14, 2008, pp. 1-11.

* cited by examiner

METHODS AND COMPOSITIONS COMPRISING A DUAL OIL/WATER-SWELLABLE PARTICLE

BACKGROUND

The present invention relates to compositions comprising swellable particles and methods of use in subterranean formations. More particularly, in certain embodiments, the present invention includes cement compositions comprising a dual oil/water-swellable particle and methods of cementing in a subterranean formation therewith.

Cement compositions may be used in a variety of subterranean applications. For example, in subterranean well construction, a pipe string (e.g., casing, liners, expandable tubulars, etc.) may be introduced into a well bore and cemented in place. The process of cementing the pipe string is commonly referred to as "primary cementing." In a typical primary cementing method, a cement composition may be pumped into an annulus between the walls of the well bore and the exterior surface of a pipe string disposed thereon. The cement composition should set in the annular space, thereby forming a cement sheath (e.g., an annular sheath of hardened, substantially impermeable cement) that may support and position the pipe string in the well bore and may bond the exterior surface of the pipe string to the subterranean formation. Among other things, the cement sheath surrounding the pipe string functions to form an annular seal, preventing the migration of fluids in the annulus, as well as protecting the pipe string from corrosion.

Once set, the cement sheath may be subjected to a variety of cyclic, shear, tensile, impact, flexural, and/or compressive stresses that may lead to failure of the cement sheath. Such failure may be the result of fractures, cracks, and/or debonding of the cement sheath from the pipe string and/or the formation. Undesirably, cement sheath failure may lead to loss of zonal isolation, resulting, for example, in the undesirable migration of fluids, e.g., oil and/or water, between formation zones. This may lead to undesirable consequences, such as lost production, costly remedial operations, environmental pollution, hazardous rig operations resulting from unexpected fluid flow from the formation caused by loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe.

SUMMARY

The present invention relates to compositions comprising swellable particles and methods of use in subterranean formations. More particularly, in certain embodiments, the present invention includes cement compositions comprising a dual oil/water-swellable particle and methods of cementing in a subterranean formation therewith.

An embodiment of the present invention includes a method that comprises introducing a fluid comprising a dual oil/water-swellable particle into a subterranean formation.

Another embodiment of the present invention includes a method of cementing that comprises introducing a cement composition comprising cement, water, and a dual oil/water-swellable particle into a space between a pipe string and a subterranean formation. The method further may comprise allowing the cement composition to set in the space.

Another embodiment of the present invention includes a method that comprises introducing a fluid comprising a dual oil/water-swellable particle into a subterranean formation. The dual oil/water-swellable particle may comprise at least one oil-swellable material selected from the group consisting of a natural rubber, a polyurethane rubber, a nitrile rubber, a hydrogenated nitrile rubber, an acrylate butadiene rubber, a polyacrylate rubber, a butyl rubber, a brominated butyl rubber, a chlorinated butyl rubber, a chlorinated polyethylene rubber, an isoprene rubber, a choloroprene rubber, a neoprene rubber, a butadiene rubber, a styrene butadiene copolymer rubber, a sulphonated polyethylene, an ethylene acrylate rubber, an epichlorohydrin ethylene oxide copolymer rubber, an ethylene-propylene-copolymer (peroxide cross-linked) rubber, an ethylene-propylene-copolymer (sulphur cross-linked) rubber, an ethylene-propylene-diene terpolymer rubber, an ethylene vinyl acetate copolymer, a fluoro rubber, a fluoro silicone rubber, a silicone rubber, a poly 2,2,1-bicyclo heptene (polynorbomeane), an alkylstyrene, a crosslinked substituted vinyl acrylate copolymer, and combinations thereof. The dual oil/water-swellable particle may comprise at least one water-swellable material selected from the group consisting of sodium bentonite, calcium bentonite, polymethacrylate, a starch-polyacrylate acid graft copolymer and salts thereof, a polyethylene oxide polymer, a carboxymethyl cellulose type polymer, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), a polyvinyl alcohol cyclic acid anhydride graft copolymer, isobutylene maleic anhydride, a vinylacetate-acrylate copolymer, a starch-polyacrylonitrile graft copolymer, and combinations thereof.

Another embodiment of the present invention includes a well treatment composition comprising a dual oil/water-swellable particle.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to compositions comprising swellable particles and methods of use in subterranean formations. More particularly, in certain embodiments, the present invention includes cement compositions comprising a dual oil/water-swellable particle and methods of cementing in a subterranean formation therewith. There may be several potential advantages to the methods and compositions of the present invention, only some of which may be alluded to herein. One of the many advantages of the present invention is that inclusion of the dual oil/water-swellable particle in well cementing methods may result in a more reliable annular seal.

An embodiment of the cement compositions of the present invention comprises cement, water, and a dual oil/water-swellable particle. Those of ordinary skill in the art will appreciate that the cement compositions generally should have a density suitable for a particular application. By way of example, a suitable cement composition may have a density of about 4 pounds per gallon ("lb/gal") to about 20 lb/gal. In certain embodiments, a suitable cement composition may have a density of about 8 lb/gal to about 17 lb/gal. Embodiments of the cement compositions may be foamed or unfoamed or may comprise other means to reduce their densities, such as hollow microspheres, low-density elastic beads, or other suitable density-reducing additives. Those of ordinary skill in the art, with the benefit of this disclosure, will recognize the appropriate density for a particular application.

Embodiments of the cement compositions of the present invention comprise a cement. Any of a variety of cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in embodiments of the present invention may be classified as API Class A, API Class C, API Class G and API Class H cements.

The water used in embodiments of the cement compositions of the present invention may be fresh water or salt water. As used herein, the term "salt water" refers to unsaturated salt water and saturated salt water, including brines and seawater. Generally, the water may be from any source, provided, for example, that it should not contain an excess of compounds that may undesirably affect other components in the cement composition. Further, the water may be present in an amount sufficient to form a pumpable slurry. In certain embodiments, the water may be present in the cement composition in an amount in the range of about 33% to about 200% by weight of the cement ("bwoc"). In certain embodiments, the water may be present in the cement composition in an amount in the range of about 35% to about 70% bwoc. One of ordinary skill in the art, with the benefit of this disclosure, will recognize the appropriate amount of water for a chosen application.

Embodiments of the cement compositions of the present invention comprise the dual oil/water-swellable particle. As used herein, the "dual oil/water-swellable particle" comprises a combination or mixture of both oil-swellable and water-swellable materials in a single particle. Furthermore, a particle is characterized as "dual oil/water-swellable" when it swells upon contact with oil and/or also swells upon contact with aqueous fluids. As used herein, the term "oil" in "oil-swellable" refers to various oils such as crude oil, diesel oil, kerosene and the like, as well as, oil-based fluids and gas or liquid hydrocarbons located in subterranean formations. As used herein, the term "water" in "water-swellable" includes fresh water, salt water and the like, as well as, water-based fluids and aqueous fluids located in subterranean formations. Among other things, inclusion of the dual oil/water-swellable particle in a cement composition may help maintain zonal isolation, for example, by swelling when contacted by oil and/or aqueous fluids to seal cracks in the cement sheath and/or micro-annulus between the cement sheath and the pipe string of formation that may be created.

Dual oil/water-swellable particles suitable for use in embodiments of the present invention may swell up to about 500% of their original size at the surface. At downhole conditions, this swelling may be more or less, depending on the conditions presented. For example, the swelling may be at least 10% at downhole conditions. In certain embodiments, the swelling may be up to about 200% at downhole conditions. However, as those of ordinary skill in the art with the benefit of this disclosure will appreciate, the actual swelling may depend on, for example, the concentration of the dual oil/water-swellable particle included in the cement composition, as well as the particular dual oil/water-swellable particle selected for use.

The dual oil/water-swellable particle may be included in embodiments of the cement compositions in an amount desired for a particular application. In some embodiments, the dual oil/water-swellable particle may be present in an amount up to about 50% bwoc (e.g., about 1%, about 5%, about 10%, about 15%, about 20%, about 25%, about 30%, about 35%, about 40%, about 45%, etc.). In certain embodiments, the dual oil/water-swellable particle may be present in an amount in the range of about 1% to about 30% bwoc and, alternatively, in an amount in the range of about 5% to about 25% bwoc.

In addition, the dual oil/water-swellable particle that is utilized may have a wide variety of shapes and sizes of individual particles suitable for use in a cement composition that is pumpable in a subterranean formation. By way of example, the swellable particles may have a well-defined physical shape and/or an irregular geometry, including the physical shape of platelets, shavings, fibers, flakes, ribbons, rods, spheroids, toroids, pellets, tablets, and other suitable physical shapes. In some embodiments, the swellable particle may have a particle size in the range of about 1 micron to about 1,500 microns. In some embodiments, the swellable particle may have a particle size in the range of about 5 microns to about 500 microns. However, it should be understood that particle sizes outside these listed ranges also may be suitable for particular applications.

An embodiment of the dual oil/water-swellable particle comprises an oil-swellable material and a water-swellable material. As used herein, a material is characterized as "oil-swellable" when it swells upon contact with oil, and a material is characterized as "water-swellable" when it swells upon contact with water. Suitable oil-swellable materials that may be used in embodiments of the dual oil/water-swellable particle include any of a variety of materials that swell upon contact with oil. Examples of suitable oil-swellable materials include, but are not limited to, natural rubber, polyurethane rubber, nitrile rubber, hydrogenated nitrile rubber, acrylate butadiene rubber, polyacrylate rubber, butyl rubber, brominated butyl rubber, chlorinated butyl rubber, chlorinated polyethylene rubber, isoprene rubber, choloroprene rubber, neoprene rubber, butadiene rubber, styrene butadiene copolymer rubber, sulphonated polyethylene, ethylene acrylate rubber, epichlorohydrin ethylene oxide copolymer rubber, ethylene-propylene-copolymer (peroxide cross-linked), ethylene-propylene-copolymer (sulphur cross-linked), ethylene-propylene-diene terpolymer rubber, ethylene vinyl acetate copolymer, fluoro rubbers, fluoro silicone rubbers, silicone rubbers, poly 2,2,1-bicyclo heptene (polynorbomeane), alkylstyrene, and crosslinked substituted vinyl acrylate copolymers. Combinations of oil-swellable materials may also be suitable.

The oil-swellable material may be included in the dual oil/water-swellable particle in an amount sufficient for a particular application. In certain embodiments, the oil-swellable material may be present in an amount in the range of about 1% to about 99% by weight of the swellable particle and, alternatively, in an amount in the range of about 25% to about 75% by weight of the swellable particle. In certain embodiments, the oil-swellable material may be present in an amount in the range of about 40% to about 60% by weight of the swellable particle and, alternatively, in an amount of about 50% by weight of the swellable particle.

Suitable water-swellable materials that may be used in embodiments of the oil/water-swellable particle include any of a variety of materials that swell upon contact with water. Examples of suitable water-swellable materials, include, but are not limited to, sodium bentonite (high swelling), calcium bentonite (low swelling), super-absorbent polymers (such as polymethacrylate and polyacrylamide) and non-soluble acrylic polymers (such as starch-polyacrylate acid graft copolymer and salts thereof), polyethylene oxide polymers, carboxymethyl cellulose type polymers, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), polyvinyl alcohol cyclic acid anhydride graft copolymer, isobutylene maleic anhydride, vinylacetate-acrylate copolymer, and starch-polyacrylonitrile graft copolymers. Combinations of water-swellable materials may also be suitable.

The water-swellable material may be included in the dual oil/water-swellable particle in an amount sufficient for a particular application. In certain embodiments, the water-swellable material may be present in an amount in the range of about 1% to about 99% by weight of the swellable particle and, alternatively, in an amount in the range of about 25% to about 75% by weight of the swellable particle. In certain embodiments, the water-swellable material may be present in an amount in the range of about 40% to about 60% by weight of the swellable particle and, alternatively, in an amount of about 50% by weight of the swellable particle.

In one embodiment of the present invention, the dual oil/water-swellable particle may comprise an oil-swellable material that comprises an ethylene-propylene polymer and a water-swellable material that comprises bentonite. The ethylene-propylene polymer may comprise an ethylene-propylene copolymer rubber or an ethylene-propylene-diene terpolymer rubber.

In another embodiment of the present invention, the dual oil/water-swellable particle may comprise an oil-swellable material that comprises a butyl rubber and a water-swellable material that comprises sodium bentonite. An example of such a swellable particle is available under the tradename WATERSTOP-RX® expanding joint waterstop from Volclay International.

Other additives suitable for use in subterranean cementing operations also may be added to embodiments of the cement compositions, in accordance with embodiments of the present invention. Examples of such additives include, but are not limited to, strength-retrogression additives, set accelerators, weighting agents, weight-reducing additives, heavy-weight additives, gas-generating additives, mechanical property enhancing additives, lost-circulation materials, filtration-control additives, dispersants, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

As will be appreciated by those of ordinary skill in the art, embodiments of the cement compositions of the present invention may be used in a variety of subterranean applications, including primary and remedial cementing. Embodiments of the cement compositions may be introduced into a subterranean formation and allowed to set therein. Embodiments of the cement compositions may comprise cement, water, and a dual oil/water-swellable particle. By way of example, in example primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in example remedial cementing embodiments, a cement composition may used, for example, in squeeze cementing operations or in the placement of cement plugs. Embodiments of the invention also comprise allowing the dual oil/water-swellable particle in the set cement composition to contact oil and/or water whereby the dual oil/water-swellable particle swells to counteract a crack in the set cement composition and/or a debonding of the set cement composition from either a pipe string or the subterranean formation.

While the preceding discussion is directed to the use of the dual oil/water-swellable particles in well cementing methods, those of ordinary skill in the art, with the benefit of this disclosure, will appreciate that the present technique also encompasses the use of dual oil/water-swellable particles in any of a variety of different subterranean treatments. For example, a dual oil/water-swellable particle may be included in any of a number of treatment fluids that may be used in subterranean treatments, including cementing fluids, drilling fluids, completion fluids and stimulation fluids.

In accordance with one embodiment, the dual oil/water-swellable particle may be included in a fracturing fluid that is introduced into a subterranean formation at or above the formation fracture pressure. Methods of fracturing a subterranean formation comprise fracturing the subterranean formation so as to create or enhance a fracture in the subterranean formation; introducing a fracturing fluid comprising a base fluid and a dual oil/water-swellable particle into the fracture; and depositing the dual oil/water-swellable particle in the fracture in the subterranean formation. Embodiments of the invention comprise fracturing fluids comprising a base fluid and a dual oil/water-swellable particle.

In accordance with one embodiment, the dual oil/water-swellable particle may be included in a fluid that is used in gravel packing in the subterranean formation. Methods of gravel packing comprise providing a gravel packing fluid comprising a base fluid and a dual oil/water-swellable particle, introducing the gravel packing fluid into a subterranean formation, and depositing at least the dual oil/water-swellable particle in the subterranean formation to form a gravel pack. Embodiments of the invention comprise gravel packing fluids comprising a base fluid and a dual oil/water-swellable particle.

In accordance with another embodiment, the dual oil/water swellable particles may be included in methods and compositions for sealing a subterranean zone. By way of example, dual oil/water-swellable particles may be included in a treatment fluid that is introduced into a particular zone of a subterranean formation, such as a lost circulation zone. When the dual oil/water-swellable particles contact oil and/or water in the subterranean zone, the dual oil/water-swellable particles may swell to counteract the flow of fluids through the subterranean zone. Methods and compositions for sealing subterranean zones are described in more detail in U.S. Pat. No. 7,026,272, the disclosure of which is incorporated herein by reference in its entirety.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:
   providing a dual oil/water swellable particle having a particle size of about 1 micron to about 1,500 microns, the dual oil/water swellable particle comprising an oil-swellable material and a water-swellable material in a single particle;
   adding the dual oil/water swellable particle to a fluid; and
   introducing the fluid into a subterranean formation.

2. The method of claim 1 wherein the fluid is selected from the group consisting of cementing fluids, drilling fluids, completion fluids, and stimulation fluids.

3. The method of claim 1 further comprising at least one step selected from the group consisting of:
   allowing the dual oil/water-swellable particle to contact oil and/or water in the subterranean formation, whereby the dual oil/water-swellable particle swells to counteract the flow of fluids through the formation;
   introducing the fluid into the subterranean formation at or above the formation fracture pressure; and
   depositing at least the dual oil/water-swellable particle into the subterranean formation to form a gravel pack.

4. The method of claim 1 wherein the oil-swellable material comprises a material selected from the group consisting of a natural rubber, a polyurethane rubber, a nitrile rubber, a hydrogenated nitrile rubber, an acrylate butadiene rubber, a polyacrylate rubber, a butyl rubber, a brominated butyl rubber, a chlorinated butyl rubber, a chlorinated polyethylene rubber, an isoprene rubber, a chloroprene rubber, a neoprene rubber, a butadiene rubber, a styrene butadiene copolymer rubber, a sulphonated polyethylene, an ethylene acrylate rubber, an epichlorohydrin ethylene oxide copolymer rubber, an ethylene-propylene-copolymer (peroxide cross-linked) rubber, an ethylene-propylene-copolymer (sulphur cross-linked) rubber, an ethylene-propylene-diene terpolymer rubber, an ethylene vinyl acetate copolymer, a fluoro rubber, a fluoro silicone rubber, a silicone rubber, a poly 2,2,1-bicyclo heptene (polynorbornene), an alkylstyrene, a crosslinked substituted vinyl acrylate copolymer, and combinations thereof.

5. The method of claim 1 wherein the water-swellable material comprises a material selected from the group consisting of sodium bentonite, calcium bentonite, polymethacrylate, a starch-polyacrylate acid graft copolymer and salts thereof, a polyethylene oxide polymer, a carboxymethyl cellulose type polymer, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), a polyvinyl alcohol cyclic acid anhydride graft copolymer, isobutylene maleic anhydride, a vinylacetate-acrylate copolymer, a starch-polyacrylonitrile graft copolymer, and combinations thereof.

6. The method of claim 1 wherein the dual oil/water-swellable particle has a particle size in the range of about 5 micron to about 500 microns.

7. The method of claim 1 wherein the oil-swellable material comprises ethylene propylene rubber and the water-swellable material comprises a bentonite.

8. The method of claim 1 wherein the oil-swellable material comprises butyl rubber and the water-swellable material comprises a sodium bentonite.

9. The method of claim 1 wherein the fluid comprises cement, water, and the dual oil/water-swellable particle.

10. The method of claim 9 further comprising allowing the fluid to set in the subterranean formation.

11. The method of claim 10 further comprising allowing the dual oil/water-swellable particle in the set fluid to contact oil and/or water whereby the dual oil/water-swellable particle swells to counteract a crack in the set fluid and/or a debonding of the set fluid from either a pipe string or the subterranean formation.

12. The method of claim 9 wherein the cement comprises at least one hydraulic cement selected from the group consisting of a Portland cement, a pozzolana cement, a gypsum cement, a high-alumina content cement, a slag cement, a silica cement, and combinations thereof.

13. The method of claim 9 wherein the dual/water-swellable particle is present in the fluid in an amount up to about 50% by weight of the cement.

14. The method of claim 1 wherein the water-swellable material comprises a calcium bentonite.

15. The method of claim 1 wherein the oil-swellable material comprises a neoprene rubber.

16. The method of claim 1 wherein the wherein the oil-swellable material is present in the swellable particle in an amount of about 1% to about 99% by weight of the swellable particle, and wherein the water-swellable material is present in the swellable particle in an amount of about 1% to about 99% by weight of the swellable particle;

17. A method of cementing comprising:
   providing a dual oil/water swellable particle having a particle size of about 1 micron to about 1,500 microns the dual oil/water swellable article comprising an oil-swellable material and a water-swellable material in a single particle, wherein the oil-swellable material is present in an amount of about 1% to about 99% by weight of the swellable particle, and wherein the water-swellable material is present in an amount of about 1% to about 99% by weight of the swellable particle;
   preparing a cement composition comprising cement, water, and the dual oil/water swellable particle in an amount up to about 50% by weight of the cement;
   introducing the cement composition into a space between a pipe string and a subterranean formation; and
   allowing the cement composition to set in the space.

18. The method of claim 17 wherein the oil-swellable material comprises a material selected from the group consisting of a natural rubber, a polyurethane rubber, a nitrile rubber, a hydrogenated nitrile rubber, an acrylate butadiene rubber, a polyacrylate rubber, a butyl rubber, a brominated butyl rubber, a chlorinated butyl rubber, a chlorinated polyethylene rubber, an isoprene rubber, a chloroprene rubber, a neoprene rubber, a butadiene rubber, a styrene butadiene copolymer rubber, a sulphonated polyethylene, an ethylene acrylate rubber, an epichlorohydrin ethylene oxide copolymer rubber, an ethylene-propylene-copolymer (peroxide cross-linked) rubber, an ethylene-propylene-copolymer (sulphur cross-linked) rubber, an ethylene-propylene-diene terpolymer rubber, an ethylene vinyl acetate copolymer, a fluoro rubber, a fluoro silicone rubber, a silicone rubber, a poly 2,2,1-bicyclo heptene (polynorbornene), an alkylstyrene, a crosslinked substituted vinyl acrylate copolymer, and combinations thereof.

19. The method of claim 17 wherein the water-swellable material comprises a material selected from the group consisting of sodium bentonite, calcium bentonite, polymethacrylate, a starch-polyacrylate acid graft copolymer and salts thereof, a polyethylene oxide polymer, a carboxymethyl cellulose type polymer, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), a polyvinyl alcohol cyclic acid anhydride graft copolymer, isobutylene maleic anhydride, a vinylacetate-acrylate copolymer, a starch-polyacrylonitrile graft copolymer, and combinations thereof.

20. The method of claim 17 wherein the dual oil/water-swellable particle has a particle size in the range of about 5 micron to about 500 microns.

21. The method of claim 17 wherein the oil-swellable material comprises ethylene propylene rubber and the water-swellable material comprises a bentonite.

22. The method of claim 17 wherein the oil-swellable material comprises butyl rubber and the water-swellable material comprises a sodium bentonite.

23. The method of claim 17 wherein the cement comprises at least one hydraulic cement selected from the group consisting of a Portland cement, a pozzolana cement, a gypsum cement, a high-alumina content cement, a slag cement, a silica cement, and combinations thereof 24. The method of claim 17 wherein the dual oil/water-swellable particle is present in the cement composition in an amount of about 1% to about 30% by weight of the cement.

25. The method of claim 17 further comprising allowing the dual oil/water-swellable particle in the set cement composition to contact oil and/or water whereby the dual oil/water-swellable particle swells to counteract a crack in the set cement composition and/or a debonding of the set cement composition from either the pipe string or the subterranean formation.

26. The method of claim 17 wherein the water-swellable material comprises a calcium bentonite.

27. The method of claim 17 wherein the oil-swellable material comprises a neoprene rubber.

28. A method comprising:
providing a dual oil/water swellable particle having a particle size of about 1 micron to about 1,500 microns the dual oil/water swellable particle comprising an oil-swellable material and a water-swellable material in a single particle, wherein the oil-swellable material is present in an amount of about 1% to about 99% by weight of the swellable particle, and wherein the water-swellable material is present in an amount of about 1% to about 99% by weight of the swellable particle;
preparing a cement composition comprising cement, water, and the dual oil/water swellable particle in an amount up to about 50% by weight of the cement;
introducing the cement composition into a subterranean formation,
wherein the oil-swellable material comprises a material selected from the group consisting of a natural rubber, a polyurethane rubber, a nitrile rubber, a hydrogenated nitrile rubber, an acrylate butadiene rubber, a polyacrylate rubber, a butyl rubber, a brominated butyl rubber, a chlorinated butyl rubber, a chlorinated polyethylene rubber, an isoprene rubber, a chloroprene rubber, a neoprene rubber, a butadiene rubber, a styrene butadiene copolymer rubber, a sulphonated polyethylene, an ethylene acrylate rubber, an epichlorohydrin ethylene oxide copolymer rubber, an ethylene-propylene-copolymer (peroxide cross-linked) rubber, an ethylene-propylene-copolymer (sulphur cross-linked) rubber, an ethylene-propylene-diene terpolymer rubber, an ethylene vinyl acetate copolymer, a fluoro rubber, a fluoro silicone rubber, a silicone rubber, a poly 2,2,1-bicyclo heptene (polynorbornene), an alkylstyrene, a crosslinked substituted vinyl acrylate copolymer, and combinations thereof, and
wherein the water-swellable material comprises a material selected from the group consisting of sodium bentonite, calcium bentonite, polymethacrylate, a starch-polyacrylate acid graft copolymer and salts thereof, a polyethylene oxide polymer, a carboxymethyl cellulose type polymer, poly(acrylic acid) and salts thereof, poly(acrylic-co-acrylamide) and salts thereof, graft-poly(ethylene oxide) of poly(acrylic acid) and salts thereof, poly(2-hydroxyethyl methacrylate), poly(2-hydroxypropyl methacrylate), a polyvinyl alcohol cyclic acid anhydride graft copolymer, isobutylene maleic anhydride, a vinylacetate-acrylate copolymer, a starch-polyacrylonitrile graft copolymer, and combinations thereof.

29. The method of claim 28 wherein the dual oil/water-swellable particle has a particle size in the range of about 5 micron to about 500 microns.

30. The method of claim 28 wherein the dual oil/water-swellable particle is present in a cement composition in an amount of about 1% to about 30% by weight of the cement.

* * * * *